US007255217B2

(12) United States Patent
Novacek et al.

(10) Patent No.: US 7,255,217 B2
(45) Date of Patent: Aug. 14, 2007

(54) WHEEL FOR DRIVING A FLEXIBLE HANDRAIL

(75) Inventors: Thomas Novacek, Schwechat (AT); Thomas Illedits, Neufeld (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 11/448,466

(22) Filed: Jun. 7, 2006

(65) Prior Publication Data

US 2006/0272925 A1 Dec. 7, 2006

(30) Foreign Application Priority Data

Jun. 7, 2005 (EP) ................................. 05104964

(51) Int. Cl.
*B65G 15/00* (2006.01)

(52) U.S. Cl. ...................................... 198/337; 198/335

(58) Field of Classification Search ................ 198/335, 198/337

See application file for complete search history.

(56) References Cited

U.S. PATENT DOCUMENTS 3,653,484 A * 4/1972 Taylor ........................ 198/335
4,618,387 A * 10/1986 Fisher et al. ........... 156/244.11
5,571,254 A * 11/1996 Saeki et al. ................. 198/334
6,199,678 B1 3/2001 Reo
6,497,318 B2 * 12/2002 Schulte et al. .............. 198/337
6,971,497 B2 * 12/2005 Illedits et al. ............... 198/330

FOREIGN PATENT DOCUMENTS

WO WO 2004/108581 A1 12/2004

* cited by examiner

*Primary Examiner*—Joe Dillon, Jr.
(74) *Attorney, Agent, or Firm*—Schweitzer Cornman Gross & Bondell LLP

(57) ABSTRACT

A wheel for driving a flexible handrail of an escalator or moving walk turns about an axis of rotation, and has a tire with a tire cover that may be filled with pressurized gas and a contact surface that is intended to rest against the handrail. The contact surface is formed on a power transmission element that has a reinforcing insert and is accommodated in a peripheral recess of the tire cover.

9 Claims, 2 Drawing Sheets

Fig. 1
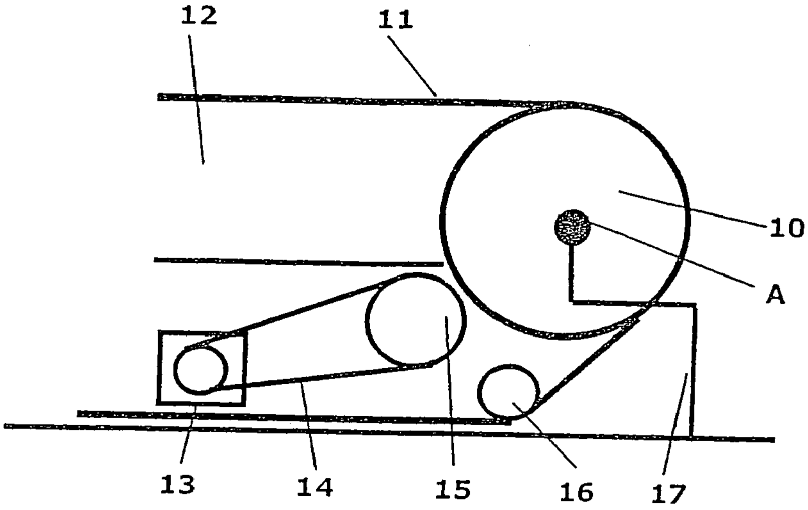
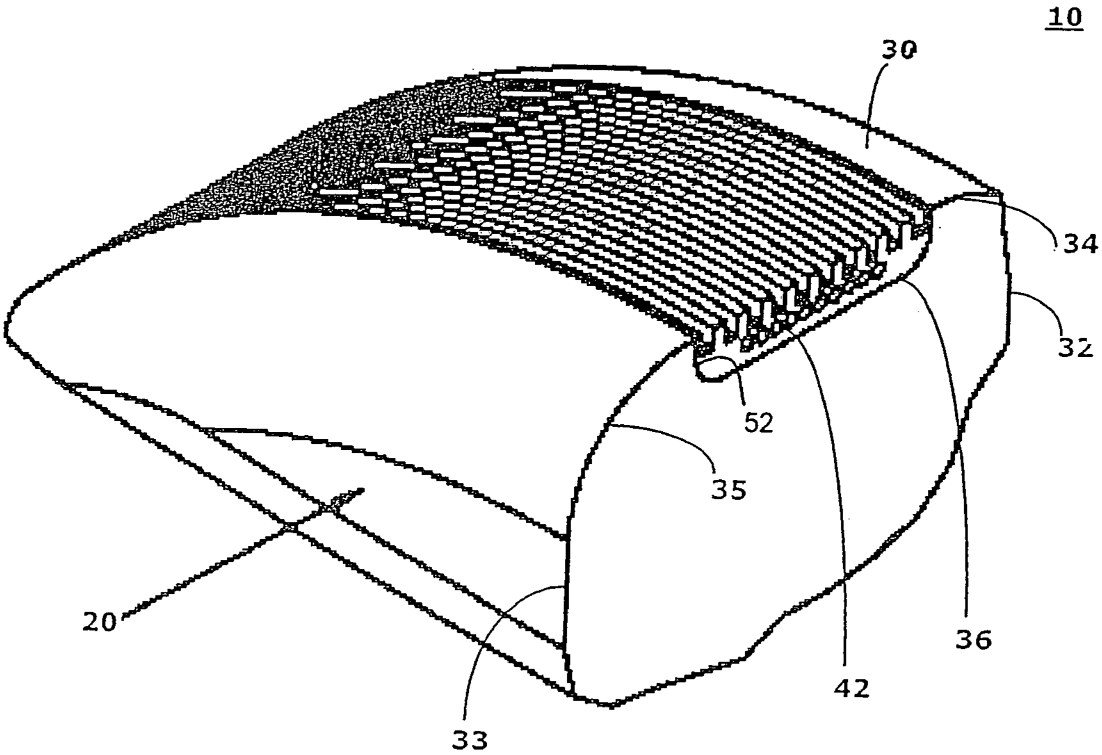
Fig. 2

WHEEL FOR DRIVING A FLEXIBLE HANDRAIL

Accommodated in the recess 36 in the tire cover 30 is a sheath-like, elastomeric power transmission element 40. The power transmission element has opposed side surfaces 52 that that are in contact with the coresponding side surfaces of the recess. The power transmission element 40 has a reinforcing insert in the form of reinforcing bodies and/or a woven or knitted fabric 42 which in the present exemplary embodiment is completely embedded in and/or embraced by, the material of the power transmission element 40 and is of metal and/or natural fibers and/or plastics.

BACKGROUND OF THE INVENTION

Escalators and moving walks generally have balustrades that are locationally fixed at their sides. Mounted on or against the balustrades are band-shaped handrails that move relative to the balustrades as synchronously as possible with the step elements of the escalator or moving walk. The handrails consist essentially of a flexible band and can be driven by a wheel that can itself be driven directly or indirectly by a motor. At the same time, the wheel can also serve the function of a diverter sheave to divert the handrail where a change of direction of the handrail is required.

The drive of handrails should be as smooth and continuous as possible, free of jerks, as quiet as possible, and the wheel as well as the handrail itself should be constructed in such a manner that noise and wear are minimized. In particular, so-called slip-stick effects should be avoided. Slip-stick effects are instability effects associated with parameters which affect the static friction and sliding friction between the handrail and the contact surface of the wheel that drives the handrail. To realize a continuous drive of the handrail, sliding of the handrail relative to the wheel should be avoided, which means that the static friction should not fall below a certain amount. In practice, however, it is common for brief periods of sliding friction to occur, which is comparable to aquaplaning and results in the said slip-stick effect.

To prevent slip-stick effects, a known wheel for driving a handrail is executed essentially as a driving-wheel tire. The driving-wheel tire is filled with a filling agent such as compressed air or an inert gas. The driving-wheel tire acts as a power transmission element with its outer circumferential surface resting under pressure against the inner surface of the handrail so that on rotation of the driving-wheel tire the handrail is driven by the static friction acting between the power transmission element and the handrail.

Disadvantageous with such a driving wheel is, among others, the formation of bulges on the driving-wheel tire, which occurs as a consequence of its elasticity, as well as substantial wear and production of noise.

It is accordingly an objective of the present invention to provide a wheel for driving a handrail of an escalator or moving walk with which the disadvantages of the prior art are avoided.

BRIEF DESCRIPTION OF THE INVENTION

In accordance with the foregoing and other objectives, the drive wheel of the present invention comprises a tire with a tire cover. The tire cover supports a power transmission element having a contact surface intended to rest against the handrail and transfer rotational motion of the wheel to the handrail. The power transmission element is accommodated in a peripheral recess in the tire cover. The tire may be filled with a pressurized gas to apply an outward force to the tire cover to bias the power transmission element against the handrail. The power transmission element may be provided with a reinforcing insert.

Important advantages of the new wheel are prevention of the slip-stick effect between the wheel and the handrail and prevention of the formation of bulges in the contact area of the wheel and handrail.

The slip-stick effect is essentially determined by the ratio of static friction and sliding friction between the outer circumferential surface of the tire cover and the handrail against which it is pressed by gas pressure. The type of friction essentially depends firstly on the respective coefficients of static and sliding friction between the materials of the cover of the tire and the handrail which are themselves affected by their surface structure and surface roughness; secondly on the pressure under which the tire cover rests against the handrail; and thirdly on the extent of the contact surface between the tire cover and the handrail.

The formation of bulges essentially depends on the respective rigidity of the material as well as the thickness of the material since, depending on these, bulges can form between the tire cover and the handrail both in and perpendicular to the direction of motion and result in vibrations that cause noise and wear.

If the slip-stick effect is prevented, the creation of noise is prevented to the extent that it depends on the energy that is freed on transition from static friction to sliding friction. If the formation of bulges is prevented, the creation of noise is reduced to the extent that it depends on the resulting vibrations. At the same time, wear of the respective components and the power required for driving is reduced, while ride comfort is increased.

The wheel for driving a flexible handrail of an escalator or moving walk according to the invention has a tire with a tire cover that is filled with pressurized gas. The tire has on its circumferential surface a depression or recess that extends in the direction of the circumference and which in the present exemplary embodiment is approximately U-shaped.

Accommodated in this recess is a power transmission element whose form is approximately that of a circular or cylindrical sheath. The outer circumferential surface of the power transmission element forms the contact surface that is intended to rest against the handrail. The power transmission element can, for example, be made from an elastomer such as NR, SBR, or HNBR. The power transmission element also has a relatively hard reinforcing insert with low elastic deformability. The reinforcing insert increases the rigidity of the tire. A tire cover can therefore be selected which is relatively easily elastically deformable so that the entire tire rests closely against the handrail without the occurrence of any undesirable side effects.

Whereas in the tire of a vehicle reinforcing inserts are usually arranged integrally and laterally or radially, in the wheel of the present invention the reinforcing insert is arranged in the separate power transmission element. The power transmission element and therefore also the reinforcing insert have relatively small radial dimensions. As opposed to use in vehicle constructions, the tire on the wheel of the present invention does not serve the purpose of facilitating roadholding and preventing aquaplaning, but rather serves primarily to ensure sufficient pressure and a sufficiently high coefficient of sliding friction so that uninterrupted static friction prevails between the wheel and the handrail.

The reinforcing insert is preferably completely embedded in the material of the actual power transmission element. By suitable choice of the material for the reinforcing insert, projections of the reinforcing insert can extend radially outward through the material of the reinforcing insert and rest against the handrail.

The reinforcing insert can have individual reinforcing bodies running in the direction of its circumference and/or a woven or knitted fabric extending in the direction of its circumference.

Possible materials for execution of the reinforcing insert are metal and/or natural fibers and/or plastics.

The external circumferential surface of the power transmission element preferably has ribs on which the contact surface is executed. The ribs can run in the direction of the circumference, or at an angle or even perpendicular to the direction of the circumference (i.e. parallel to the axis of rotation).

The external circumferential surface of the power transmission element preferably has a plurality of projections on which the contact surface is executed.

The structure on which the contact surface is executed can be adapted to the reinforcing insert in such manner that the reinforcing insert supports the projecting areas of the structure.

The tire of the wheel may usually have a single power transmission element. It is, however, also possible to divide the power transmission element into several sub-elements, it being possible for such sub-elements to form sectors and/or to be arranged adjacent to each other in the direction of the axis of rotation. Adjacent sub-elements are preferably accommodated in recesses of their own in the tire cover.

It is preferable for the wheel to be driven by a lantern pinion wheel such as is shown in EP1464609. The lantern pinion wheel engages the step chain and turns the wheel, which comes into contact with the handrail either on the upper or lower surface of the handrail and moves the handrail. Alternatively, the wheel can also be driven by a conventional handrail drive unit such as, for example, a friction wheel.

BRIEF DESCRIPTION OF THE DRAWINGS

Further characteristics and advantages of the wheel according to the invention are explained below in relation to exemplary embodiments and by reference to the annexed drawings, wherein:

FIG. 1 is a highly simplified side view of a portion of a moving walk or escalator with a handrail that can be driven by means of a wheel according to the invention FIG. 2 is a partial diagrammatical representation of a drive wheel according to the invention;

BRIEF DESCRIPTION OF THE INVENTION

Figure 3:
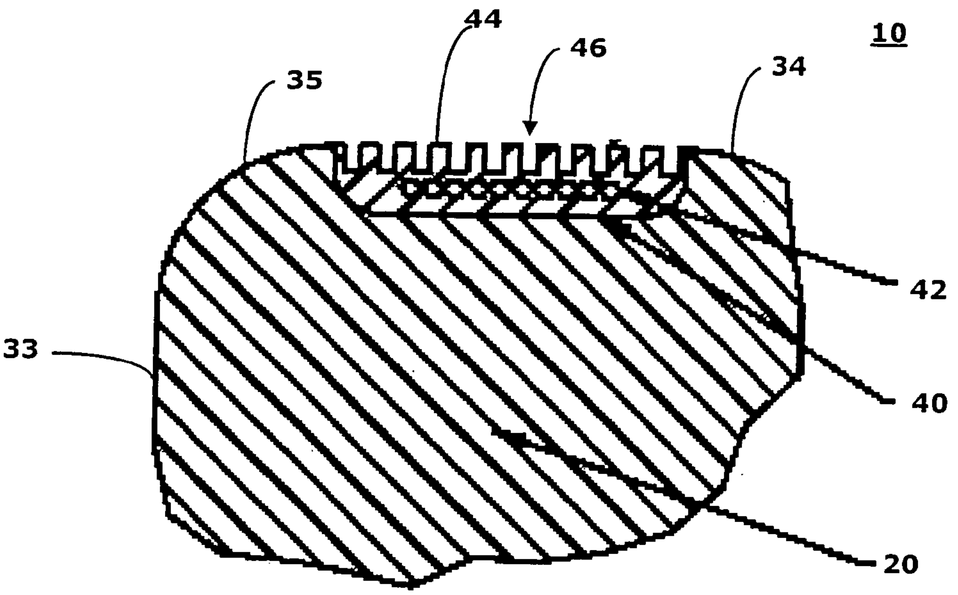
FIG. 3 is a partial cross-sectional view of the wheel shown in FIG. 2.

FIG. 1 shows a wheel 10 according to the invention that can be turned about an axis of rotation A and drives a handrail 11. The handrail 11 is located on the upper edge of a balustrade 12 that is arranged at the side of not-shown step elements of the escalator or moving walk. The handrail 11 lies longitudinally at almost 180° to the wheel 10. Driving of the wheel 10 takes place, for example, by means of a motor 13 via an endless element 14 and a drive wheel 15. A diverter pulley 16 is also provided for the handrail. The wheel 10 is fastened in a conventional manner to a locationally fixed supporting construction 17.

According to FIGS. 2 and 3 the wheel 10 has a tire 20 with a tire cover portion 30 and a power transmission element 40.

The tire cover 30 has two side surfaces 32, 33, and adjoining these, two curved surfaces 34, 35. The curved surfaces 34, 35 lead to a depression or recess 36 in the circumference of the tire cover 30 face and may have the form of an elongated U.

Accommodated in the recess 36 in the tire cover 30 is a sheath-like, elastomeric power transmission element 40. The power transmission element 40 has a reinforcing insert 42 which in the present exemplary embodiment is completely embedded in and/or embraced by, the material of the power transmission element 40 and is of metal and/or natural fibers and/or plastics.

The external circumferential surface of the power transmission element 40 may have a structure that is formed with ribs 44 running in a direction of between 0° and 90° in a direction of the circumference of the wheel. As depicted in the Figures, the angle is 0 degrees, i.e., ribs running in the direction of the circumference. Alternatively, the structure of the external circumferential surface of the power transmission element 42 can have ribs that run at an angle or perpendicular to the direction of the circumference (i.e. parallel to the axis of rotation). Instead of ribs 44, the structure can also be formed with stud-like projections.

It is preferable that the external circumferential surface of the power transmission element to have a plurality of such projections (e.g. in the form of ribs 44 or studs) on which, or by means of which, the contact surface 46 of the power transmission element is formed.

The structure by which the contact surface 46 is executed can be adapted to the nature of the reinforcing insert 44 in such a manner that the reinforcing insert 44 supports the projecting areas of the structure.

Figure 4:
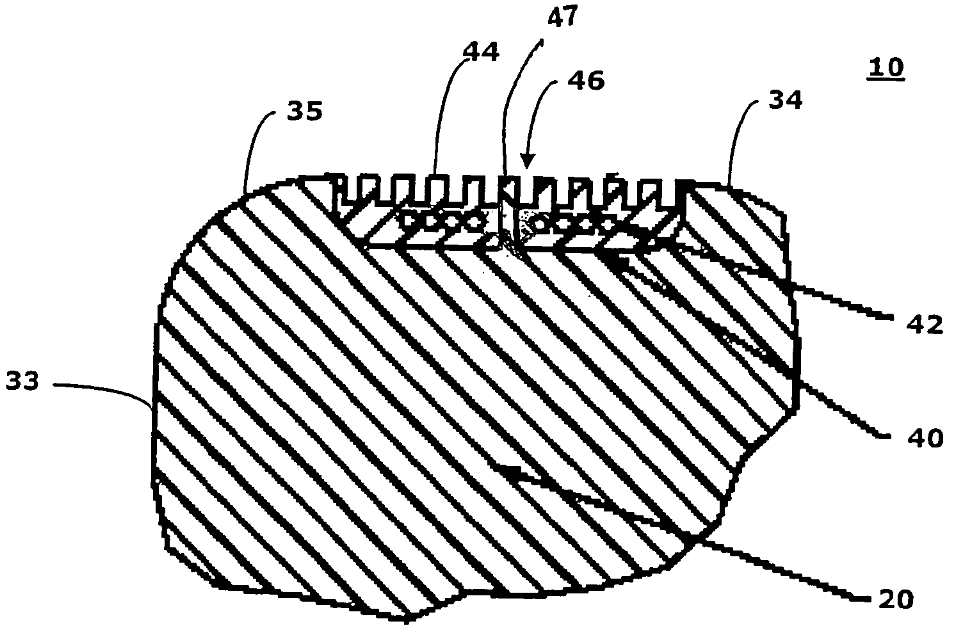
FIG. 4 is a partial cross-section of the wheel in FIG. 2 depicting an alternative embodiment of the power transmission element.

As depicted in FIG. 4, the power transmission element 40 may be divided into two or more sub-elements 40', separated by tire cover portion(s) 47. Also presented in this embodiment are the projections 40 in the form of studs.

As previously stated, the tire 20 may be formed with a bladder that is filled with a pressurized gas. By increasing the internal pressure in the wheel 10 and the tire 20, the power transmission element 40 can be moved outwardly from the axis of rotation A so as to increase the press-on pressure against the inside of the handrail 11 with which it engages.

We claim:

1. A handrail drive for an escalator or moving walk, comprising a flexible handrail and a wheel for driving the flexible handrail that can be turned about an axis of rotation A, the wheel comprising a tire with a tire cover and with a power transmission element having a contact surface adapted to rest against the handrail, the power transmission element being accommodated in a peripheral recess of the tire cover and having a reinforcing insert for increasing the rigidity of the tire.

2. A handrail drive according to claim 1, wherein the power transmission element has side outer surfaces in contact with bounding side surfaces of the peripheral recess of the tire cover.

3. A handrail drive according to claim 1 or 2, wherein the reinforcing insert of the power transmission element is completely embraced by a material of the power transmission element.

4. A handrail drive according to claim 1 or 2, wherein the power transmission element is less elastically deformable than the tire cover.

5. A handrail drive according to claim 3, wherein the reinforcing insert has reinforcing bodies running in the direction of a circumference of the wheel.

6. A handrail drive according to claim 3, wherein the reinforcing insert is formed by a woven or knitted fabric arranged in the direction of a circumference of the wheel.

7. A handrail drive according to claim 3, wherein the reinforcing insert is constructed of at least one of a metal, natural fiber or plastic material.

8. A handrail drive according to claim 1 or 2, wherein the contact surface is formed by ribs of the power transmission element that run at an angle of between 0° and 90° to the direction of a circumference of the wheel.

9. A handrail drive according to claim 1 or 2, wherein the power transmission element is divided into several sub-elements.

* * * * *